US011544462B2

(12) United States Patent
Bastide et al.

(10) Patent No.: US 11,544,462 B2
(45) Date of Patent: Jan. 3, 2023

(54) PROCESSING ELECTRONIC COMMUNICATIONS TO PROMOTE ACHIEVEMENT

(71) Applicant: International Business Machines Corporation, Armonk, NY (US)

(72) Inventors: Paul R. Bastide, Boxford, MA (US); Matthew E. Broomhall, Goffstown, NH (US); Liam S. Harpur, Dublin (IE); Lin Sun, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 515 days.

(21) Appl. No.: 16/213,030

(22) Filed: Dec. 7, 2018

(65) Prior Publication Data

US 2020/0184011 A1 Jun. 11, 2020

(51) Int. Cl.
*G06F 40/289* (2020.01)
*G09B 19/00* (2006.01)
*H04L 51/52* (2022.01)

(52) U.S. Cl.
CPC ........... *G06F 40/289* (2020.01); *G09B 19/00* (2013.01); *H04L 51/52* (2022.05)

(58) Field of Classification Search
CPC ........ G06F 40/289; G09B 19/00; H04L 51/32
USPC ........................................................ 434/236
See application file for complete search history.

(56) References Cited

U.S. PATENT DOCUMENTS

| | | | |
|---|---|---|---|
| 9,147,220 B2 | 9/2015 | Yoo | |
| 9,439,035 B2 | 9/2016 | Fraccaroli | |
| 9,544,382 B2 | 1/2017 | Bosworth et al. | |
| 10,061,857 B1 | 8/2018 | Chasse et al. | |
| 2004/0215737 A1 | 10/2004 | Della Pasqua | |
| 2008/0249968 A1* | 10/2008 | Flinn ..................... | G06N 20/00 706/14 |

(Continued)

FOREIGN PATENT DOCUMENTS

WO 2016/206099 A1 12/2016

OTHER PUBLICATIONS

Nouh et al. (Identifying Key Players in online activist groups on the Facebook social network group © 2015 pp. 970-979) (Year: 2015).*

(Continued)

*Primary Examiner* — Sherrod L Keaton
(74) *Attorney, Agent, or Firm* — Edell, Shapiro & Finnan, LLC (57) ABSTRACT

A computer system processes electronic communications. A density and centrality of a group of users engaged in electronic communications is determined based on an analysis of a social network graph indicating connections of the users of the group. The electronic communications are analyzed and an affinity of the electronic communications to a constructive goal of a user of the group is determined based on a frequency of electronic communications pertaining to the constructive goal and the determined density and centrality. The electronic communications are modified to advance progress of the constructive goal in response to the affinity satisfying a threshold. Embodiments of the present (Continued)

invention further include a method and program product for processing electronic communications in substantially the same manner described above.

20 Claims, 6 Drawing Sheets

(56) References Cited

U.S. PATENT DOCUMENTS

| | | | |
|---|---|---|---|
| 2012/0095862 A1* | 4/2012 | Schiff | G06Q 30/06 705/26.7 |
| 2013/0191113 A1* | 7/2013 | In | G06F 16/9535 704/9 |
| 2015/0294595 A1* | 10/2015 | Hu | G06Q 10/101 434/236 |
| 2017/0012913 A1 | 1/2017 | Lohani | |
| 2017/0032416 A1 | 2/2017 | Soni et al. | |
| 2017/0064020 A1 | 3/2017 | Obukhov et al. | |
| 2017/0337250 A1 | 11/2017 | Li et al. | |
| 2017/0351710 A1* | 12/2017 | Zhu | G06F 16/9535 |
| 2018/0018318 A1 | 1/2018 | Majumder | |
| 2018/0196813 A1 | 7/2018 | Lin et al. | |

OTHER PUBLICATIONS

Nouh et al. ("Nouh" Identifying Key Players in online activist groups on the Facebook social network group © 2015 pp. 969-978) (Year: 2015).*

Du, Donglei; "Social Network Analysis: Centrality Measures", University of New Brunswick, Canada, Feb. 2018, pp. 1-85.

Kourtellis et al.; "Leveraging Peer Cenliality in The Design of Socially-Informed Peer-To-Peer Systems", Cornell University Library, Oct. 22, 2012, pp. 1-18.

Nouh et al.; "Identifying Key-Players in Online Activist Groups on The Facebook Social Network", IEEE 15th International Conference on Data Mining Workshops, Nov. 14-17, 2015, pp. 969-978.

Das, Sima; "On Local and Global Centrality in Large Scale Networks", Cornell University Library, Jun. 11, 2014, pp. 1-8.

Social Networks Influence Health Behaviors, Science Daily, https://www.sciencedaily.com/releases/2010/09/100902141603.htm, Sep. 3, 2010, 3 pages.

* cited by examiner

PROCESSING ELECTRONIC COMMUNICATIONS TO PROMOTE ACHIEVEMENT

BACKGROUND

1. Technical Field

Present invention embodiments relate to processing electronic communications, and more specifically, to processing electronic communications to promote positive goal achievement.

2. Discussion of the Related Art

When an individual resolves to change an undesired trait or behavior, the individual may focus on achieving a stated goal in order to foster personal development. For example, an individual may set a particular fitness or dietary goal in order to improve his or her physical fitness. Online content to which an individual is exposed may, consciously or subconsciously, influence the individual's likelihood of meeting goals. In particular, when a user interacts on social media, the electronic communications of peers can affect the user's progress toward accomplishing goals.

SUMMARY

According to one embodiment of the present invention, a computer system processes electronic communications. A density and centrality of a group of users engaged in electronic communications is determined based on an analysis of a social network graph indicating connections of the users of the group. The electronic communications are analyzed and an affinity of the electronic communications to a constructive goal of a user of the group is determined based on a frequency of electronic communications pertaining to the constructive goal and the determined density and centrality. The electronic communications are modified to advance progress of the constructive goal in response to the affinity satisfying a threshold. Embodiments of the present invention further include a method and program product for processing electronic communications in substantially the same manner described above.

BRIEF DESCRIPTION OF THE DRAWINGS

Generally, like reference numerals in the various figures are utilized to designate like components.

DETAILED DESCRIPTION

Present invention embodiments relate generally to processing electronic communications, and more specifically, to processing electronic communications to promote goal achievement. When an individual socializes, the individual's progression toward achieving certain goals may be affected, as social reinforcement can encourage or discourage an individual to adopt certain behaviors. For example, as a user socializes via electronic communications, the user's exposure to certain electronic communications may positively or negatively affect the user's progression toward certain goals, such as academic, career, dietary, or exercise goals.

Present invention embodiments analyze a social network graph of a user in a group of users who are engaged in electronic communications, and then analyze electronic communications to determine whether each communication pertains to a goal of the user. Electronic communications are modified in order to expose the user to communications that encourage the user's progression toward goals, while minimizing the user's exposure to communications that might tend to hinder goal progression.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Figure 1:
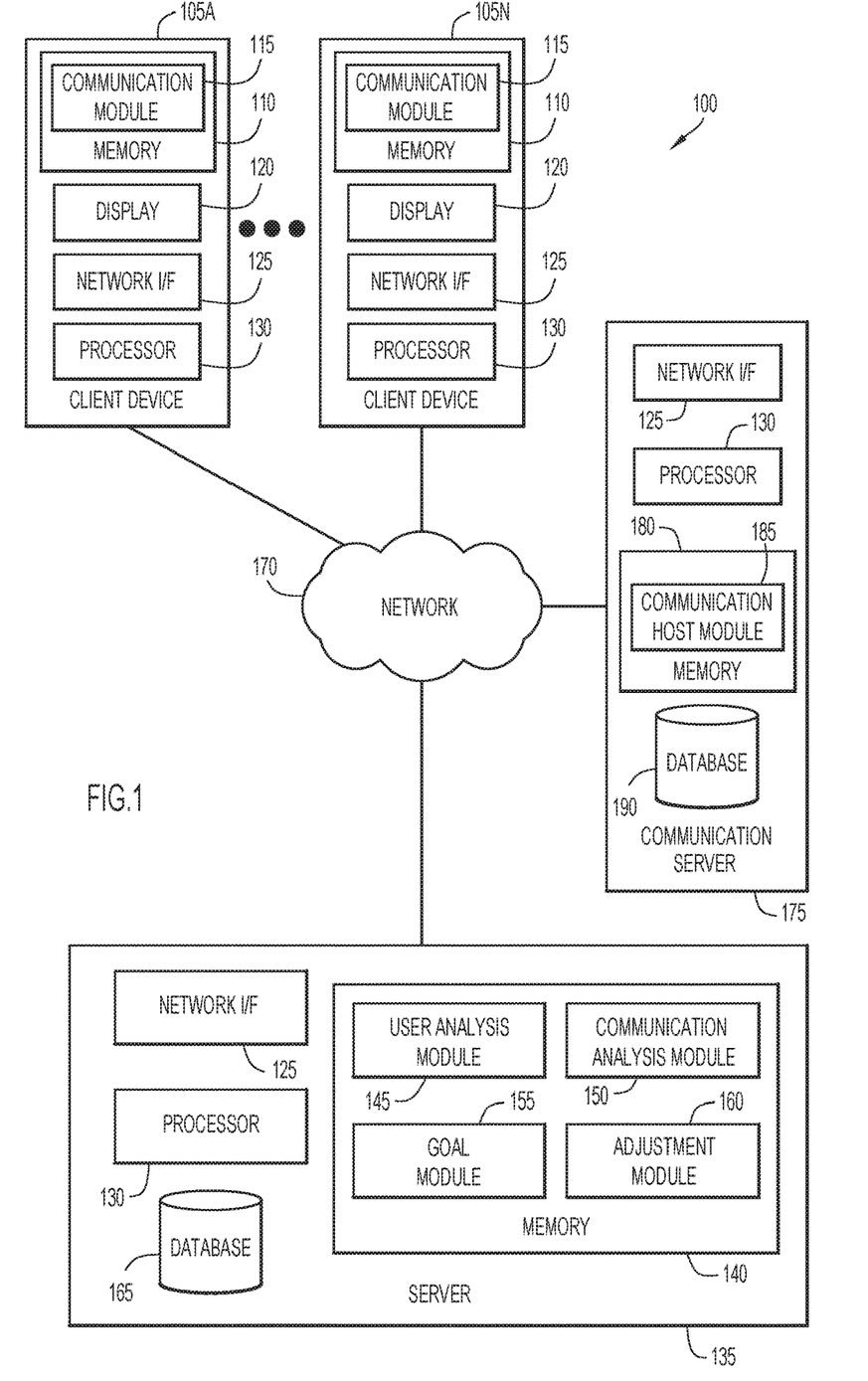
FIG. 1 is a block diagram depicting a computing environment for processing electronic communications to promote goal achievement in accordance with an embodiment of the present invention.

Present invention embodiments will now be described in detail with reference to the Figures. FIG. 1 is a block diagram depicting a computing environment 100 for processing electronic communications in accordance with an embodiment of the present invention. As depicted, computing environment 100 includes client devices 105A-105N, a server 135, a network 170, and a communication server 175. It is to be understood that the functional division among components of computing environment 100 have been chosen for purposes of explaining the present invention embodiments and is not to be construed as a limiting example.

Each client device 105A-105N includes memory 110 with communication module 115, a display 120, a network interface 125, and at least one processor 130. In various embodiments of the present invention, client device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Each client device 105A-105N may include internal and external hardware components, as depicted and described in further detail with respect to FIG. 4.

Communication module 115 may include one or more modules or units to perform various functions of present invention embodiments described below. Communication module 115 may be implemented by any combination of any quantity of software and/or hardware modules or units, and may reside within memory 110 of each client device 105A-105N for execution by a processor, such as processor 130.

Communication module 115 may enable a user of each client device 105A-105N to participate in conversations by exchanging electronic communications on a network-accessible medium, such as a chat room, social media website, or messaging application. For example, communication module 115 may enable a user of client device 105A to exchange messages with a user of client device 105N. Communication module 115 may indirectly exchange messages with other client devices by way of a server, such as communication server 175. In some embodiments, communication module 115 enables users to communicate via email, short message service (SMS), and/or Multimedia Messaging Service (MMS). Messages exchanged by communication module 115 may include any form of media, such as text, images, audio, and/or video. In some embodiments, communication module 115 may include a web browser that enables a user to view electronic communications on a website. For example, communication module 115 may enable a user to read electronic communications on a social media website, or to provide electronic communications to a social media website. In some embodiments, communication module 115 may present a news feed to a user that includes electronic communications from one or more of the user's contacts on a social media website.

Display 120 may include any electronic device capable of presenting information in a visual form. For example, display 120 may be a liquid crystal display (LCD), a cathode ray tube (CRT) display, a light-emitting diode (LED) display, an electronic ink display, and the like. A user of a client device, such as client device 105A, may read electronic communications on display 120 and/or use display 120 to compose electronic communications.

Server 135 includes a network interface 125, at least one processor 130, memory 140, and a database 165. In general, server 135 and its modules analyze a user's interactions with other users and processes electronic communications to promote goal achievement. Server 135 and its modules may receive information relating to users and electronic communications from client devices 105A-105N and communication server 175. Server 135 may include internal and external hardware components, as depicted and described in further detail with respect to FIG. 4.

Memory 140 includes user analysis module 145, communication analysis module 150, goal module 155, and adjustment module 160. User analysis module 145, communication analysis module 150, goal module 155, and adjustment module 160 may include one or more modules or units to perform various functions of present invention embodiments described below. User analysis module 145, communication analysis module 150, goal module 155, and adjustment module 160 may be implemented by any combination of any quantity of software and/or hardware modules or units, and may reside within memory 140 of server 135 for execution by a processor, such as processor 130.

User analysis module 145 may analyze a network graph of users in order to determine the relative importance of other users to a selected user. A network graph may include nodes corresponding to users, and edges between nodes that correspond to relationships between users. Two or more users may be related if the users have exchanged electronic communications, or if the users are friends or contacts on a social networking website (such as a website that may be hosted by communication server 175). Using graph analysis, user analysis module 145 can determine the centrality and density of a cluster of users. Centrality may be determined by finding a node or nodes that are linked to the most other nodes, and density may be determined according to the total number of edges in the graph. For example, if the average number of friends that a user has is three, and a particular user has twenty friends, that user may be considered an index of centrality for the group of users. Similarly, if a group of users has a greater-than-average number of relationships between users as compared to another group of users, then the first group of users has a higher density than the second group. User analysis module 145 may thus analyze a network graph of users from the perspective of a selected user in order to determine the degree to which other users influence the selected user. Using centrality and density measurements, user analysis module 145 may determine a statistical minimum threshold number of users that can influence a selected user. For example, a lower number of users issuing a message in a dense network may be equivalent to a greater number of users issuing a message in a less-dense proximate cluster.

Communication analysis module 150 may analyze electronic communications of one or more users to determine a topic of a conversation and the topic's relation to any stated goals of a user. Communication analysis module 150 may use conventional or other natural language processing techniques to identify topics of electronic communications that correspond to goals of a user. In some embodiments, communication analysis module 150 uses Alchemy API® to determine a topic of conversation between two or more users exchanging electronic communications. Communication analysis module 150 may identify topics of communications based on words, n-grams, phrases, or other natural language parts.

Goal module 155 may track one or more goals of a user and score the user's exposure to content relating to the goals to detect movement toward or away from a goal. A user of a client device, such as client device 105A, may provide goal module 155 with one or more goals to manage. In some embodiments, goals are predetermined and a user indicates a selection of one or more goals. Goals may be any aspirational achievement, including, but not limited to, fitness goals, weight loss goals, career goals, and/or academic goals. For example, a user's goals may include "exercise for ten minutes every day," "lose two pounds this month," "complete project by next Tuesday," "earn a B+ average or higher in classes this semester," and the like.

Goal module 155 may track a user's goal progression using a scoring system. When communication analysis module 150 determines that a topic of an electronic communication in which a user is involved is related to a goal of the user, goal module 155 may add or subtract points accordingly. For example, if a user has set a healthcare goal to achieve a 10% reduction in the amount of saturated fat consumed, and a user sends or receives an electronic communication discussing getting hamburgers for lunch, then goal module 155 may subtract points from the user's goal. In some embodiments, goal module 155 manages goals using a table in which tokens are mapped to goals in order to gamify goal achievement. For example, when a user sends or receives an electronic communication that is favorable for the user's goal, goal module 155 may add a token or point for that goal; similarly, when an electronic communication is unfavorable toward a goal, goal module 155 may remove a token or point from the goal. Goal module 155 may mark certain words as negative. For example, "fried" or "candy" may be scored negatively. Goal module 155 may employ synonym-to-root mapping and antonym-to-root mapping in order to simplify processing of communications by reducing common synonyms or antonyms to the same root.

In some embodiments, goal module 155 scores goal progression according to a degree of affinity of an electronic communication to a goal. Goal module 155 may utilize a Latent Class model to ascertain the affinity that elements of electronic communications may have to one or more of a user's goals. The Latent Class model may include one or more variables that are mapped to each of a user's goals. In some embodiments, goal module 155 scores certain communications more strongly based on factors such as the intensity and velocity of the communications. If a communication uses more emphatic language to discuss a topic, or there are multiple communications relating to the same topic that are received within a selected time duration, goal module 155 may conduct a more heavily-weighted scoring of the related goal. For example, if a user sends or receives electronic communications that discuss an unhealthy food to an inordinate degree, then goal module 155 may remove more tokens from a user's health goal than if the user had only mentioned an unhealthy food once in passing.

Adjustment module 160 may adjust electronic communications in order to emphasize or de-emphasize communications that relate to one or more of a user's goals. In some embodiments, adjustment module 160 may adjust a user's exposure to electronic communications in a news feed of a social media website. When goal module 155 detects communications corresponding to movement toward or away from a goal of a user, adjustment module 160 may modify the electronic communications accordingly in order to limit or enhance the user's exposure to the communications. For example, when goal module 155 detects that a group of electronic communications are deleterious to a user's achievement of a goal, adjustment module 160 may de-rank those electronic communication in a news feed presented to the user, so that the user would have to scroll down farther to read those electronic communications. Similarly, adjustment module 160 may prioritize electronic communications in a news feed when the electronic communications promote achievement of a goal. Adjustment module 160 may adjust electronic communications in a text messaging session. For example, when a group of users is conducting a text messaging session via client devices 105A-105N, adjustment module may delay text messages to a user's client device that goal module 155 has deemed to be unfavorable toward a goal.

Adjustment module 160 may promote goal achievement by removing or censoring electronic communications that are associated with movement away from a goal. In some embodiments, when adjustment module 160 removes an electronic communication, the electronic communication may be replaced with another electronic communication that is associated with movement toward a goal. In some embodiments, adjustment module 160 modifies a social stream or news feed of a website associated with communication server 175. Adjustment module 160 may use an application program interface (API) to alter a social stream or news feed of a third-party web site.

Adjustment module 160 may emphasize or de-emphasize communications according to the source of the communication. In particular, adjustment module 160 may consider the importance of sources to a user as determined by user analysis module 145. Based on the density and centrality of a group of users, adjustment module 160 may determine which users are more likely to influence a selected user, and emphasize or de-emphasize their electronic communications to a greater degree. For example, if two communications are both associated with movement toward a goal of a user, adjustment module 160 may modify a news feed by emphasizing a communication sent by a user having more relationships to other users (e.g., a user associated with greater centrality) over a communication sent by a user having fewer relationships. Thus, both communications are emphasized, but greater emphasis is placed on the communication associated with the more influential user.

In some embodiments, adjustment module 160 may adjust parameters associated with a goal of a user. In response to goal module 155 determining that electronic communications are associated with movement toward or away from a goal, adjustment module 160 may adjust goal parameters accordingly. For example, if goal module 155 detects electronic communications that are associated with unhealthy food, adjustment module 160 may adjust a parameter of an exercise goal, such as the number of minutes of elevated heart rate that a user should achieve that day. Adjustment module 160 may send a notification to a client device of a user, such as client device 105A, which may alter parameters of a user's goals accordingly. In some embodiments, adjustment module 160 may interact with third-party applications installed on a client device in order to alter goal parameters.

Database 165 may include any non-volatile storage media known in the art. For example, database 165 can be implemented with a tape library, optical library, one or more independent hard disk drives, or multiple hard disk drives in a redundant array of independent disks (RAID). Similarly, data on database 165 may conform to any suitable storage architecture known in the art, such as a file, a relational database, an object-oriented database, and/or one or more tables. Database 165 may include any data relating to processing of electronic communications to promote goal achievement, including any electronic communications between client device 105A-105N, goals of users, goal tables of users, network graphs of users, and the like.

Network 170 may include a local area network (LAN), a wide area network (WAN) such as the Internet, or a combination of the two, and includes wired, wireless, or fiber optic connections. In general, network 170 can be any combination of connections and protocols that will support communications between client devices 105A-105N, server 135, and communication server 175 via their respective network interfaces 125 in accordance with embodiments of the present invention.

Communication server 175 includes a network interface 125, at least one processor 130, memory 180, and a database 190. In general, communication server 175 and its modules provide a communication platform for users of client device 105A-105N. Communication server 175 and its modules may receive information relating to users and electronic communications from client devices 105A-105N. Communication server 175 may include internal and external hardware components, as depicted and described in further detail with respect to FIG. 4.

Memory 180 includes communication host module 185. Communication host module 185 may include one or more modules or units to perform various functions of present invention embodiments described below. Communication host module 185 may be implemented by any combination of any quantity of software and/or hardware modules or units, and may reside within memory 180 of communication server 175 for execution by a processor, such as processor 130.

Communication host module 185 may host a messaging service to facilitate the exchange of electronic communications between two or more conversation participants. Each conversation participant may be associated with a client device 105 and may send and receive messages with users of other client devices 105. When an incoming communication is received, communication host module 185 may send the communication to a recipient or may present that communication to a news feed or social stream for other users to view.

Database 190 may include any non-volatile storage media known in the art. For example, database 190 can be implemented with a tape library, optical library, one or more independent hard disk drives, or multiple hard disk drives in a redundant array of independent disks (RAID). Similarly, data on database 190 may conform to any suitable storage architecture known in the art, such as a file, a relational database, an object-oriented database, and/or one or more tables. Database 190 may include any data relating a website, such as a social media website, including webpages, user accounts, news feeds or social streams, and the like.

Figure 2:
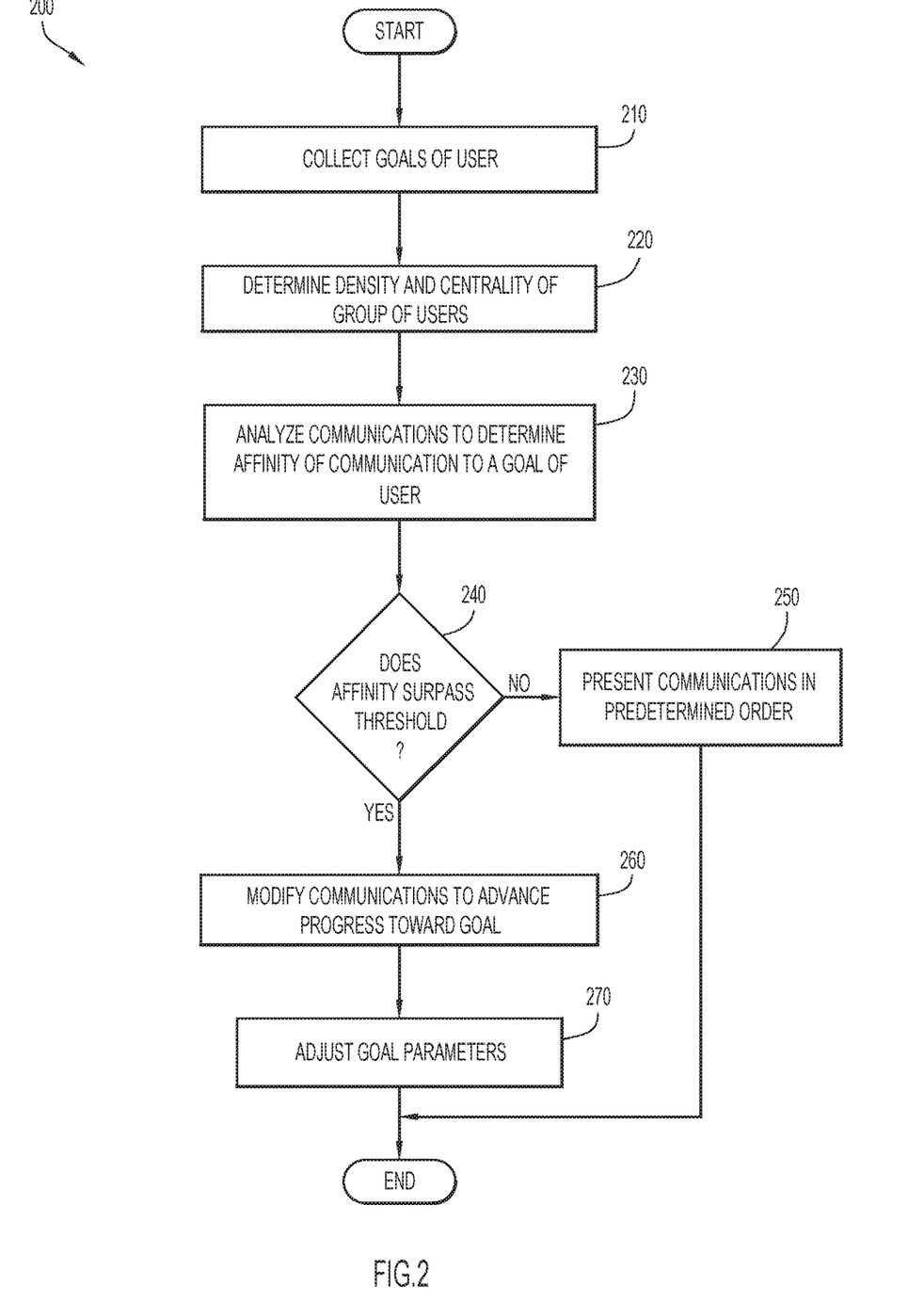
FIG. 2 is a flow chart depicting a method of processing electronic communications to promote goal achievement in accordance with an embodiment of the present invention.

FIG. 2 is a flow chart depicting a method of processing electronic communications to promote goal achievement in accordance with an embodiment of the present invention.

One or more goals of a user are collected at operation 210. A user of a client device, such as client device 105A, may input one or more goals for tracking by goal module 155 of server 135. A goal may be constructive in nature (e.g., useful, productive) and may include any achievement for which process can be tracked, such as a health goal, a fitness goal, a career goal, an academic goal, and the like. In some embodiments, a user makes a selection of predefined goals. A user may select goals and/or track goal progression using one or more third-party applications installed on a client device. For example, a user may use a third-party health application to log calories consumed. Server 135 may access a client device, such as client device 105A, to retrieve data stored or generated by a third-party application. In some embodiments in which a third-party application shares data with a third-party server, server 135 utilizes an API to access the third-party server in order to retrieve data relating to a user's goals and/or goal progression.

The density and centrality of a group of users is determined at operation 220. The group of users may include any users that are engaged in electronic communications with the selected user. The group of users may communicate using a social network site, or may communicate via text messaging sessions, third-party messaging applications, email, and the like. User analysis module 145 of server 135 may receive a network graph describing a group of users in which users are represented as nodes and relations between users are represented as edges. User analysis module 145 may then perform graph analysis to determine which nodes (e.g., users) are indices of centrality, and may determine the density of the group of users.

Electronic communications are analyzed to determine an affinity of a communication to a goal of a user at operation 230. Communication analysis module 150 may utilize conventional or other natural language processing techniques in order to determine topics of conversation. A Latent Class model may be used to determine the affinity of a communication to a goal of a user. The Latent Class model may identify an implied class based on the makeup of the natural language used. For example, the Latent Class model may analyze the phrase "having some amazing burgers with friends" to calculate a likelihood that the class is "junk food" versus "health food," or "healthy habits." Additionally or alternatively, the content may be identified based on the constituent elements of the objects of the language. For example, "barbeque" implies the presence of unhealthy food, so there may be statistical evidence of poor health choices when the phrase "barbeque" appears in a conversation.

The Latent Class model may provide a positive score for each instance in which an element of a communication is positively correlated with furtherance of a selected goal, and a negative score for each instance in which an element of a communication is negatively correlated. The Latent Class model may score communications on an individual basis or on a group basis. In some embodiments, the Latent Class model adjusts the magnitude of a score based on factors such as the intensity and velocity (e.g., frequency over a selected time period) of the communications. Thus, goal module 155 may determine an affinity score that reflects a communication's propensity to encourage or discourage a user's progression toward a particular goal.

Operation 240 determines whether the affinity surpasses a threshold. The affinity score of a communication or group of communications may be compared to a preselected threshold value to determine whether the communication or group of communications should be modified before being presented to a user. For example, if a communication's affinity score is −2, and a threshold value is −1, then the communication surpasses the threshold in the negative direction. A group of communications may similarly be evaluated against a threshold. In some embodiments, affinity scores are compute for each communication in a communication session, and the affinity scores are added together and compared against a threshold.

If the affinity score does not surpass a threshold, then communications are presented in a predetermined order at operation 250. Communications may be presented in an original order, such as in a chronological order based on sending time or arrival time. If the affinity score exceeds a threshold, then communications are modified to advance a user's progress toward a goal at operation 260. Communications (or groups of communications) that exceed a threshold may be emphasized or de-emphasized depending on whether the communication supports or impairs achievement of a goal. Based on an implied statistical significance that is determined by a Latent Class model, adjustment module 160 may use the aggregated importance to emphasize or de-emphasize the correlated message (e.g., all messages in a thread, or a single message, or all the messages from users related to the post). Adjustment module 160 may also modify communications based on the degree of importance or influence of the sender, which may be determined according to the centrality and density measures calculated by user analysis module 145. In some embodiments, adjustment module 160 may implement data mining to ascertain beneficial content for a user's news feed, and may modify the news feed to introduce the beneficial content. Beneficial content may be selected based on the specific content, frequency of content (e.g., to avoid oversaturating a user's feed with content that is too similar), and other users involved. Adjustment module 160 may perform data mining on one or more data sources, including third-party data sources, in order to discover content. Beneficial content may be introduced in response to a deleterious communication being removed or de-emphasized.

Goal parameters are adjusted at operation 270. When communications that are deleterious to goal achievement pass an affinity threshold, adjustment module 160 may alter one or more parameters of a user's goal. Goal parameters may quantify the tasks that a user must complete in order to accomplish a goal. For example, if a user has a goal of weight loss, and a goal parameter of jogging twenty minutes a day, then adjustment module 160 may extend the user's jog to one hour on a day when the user sends or receives electronic communications relating to eating a cheeseburger for lunch.

Figure 3A:
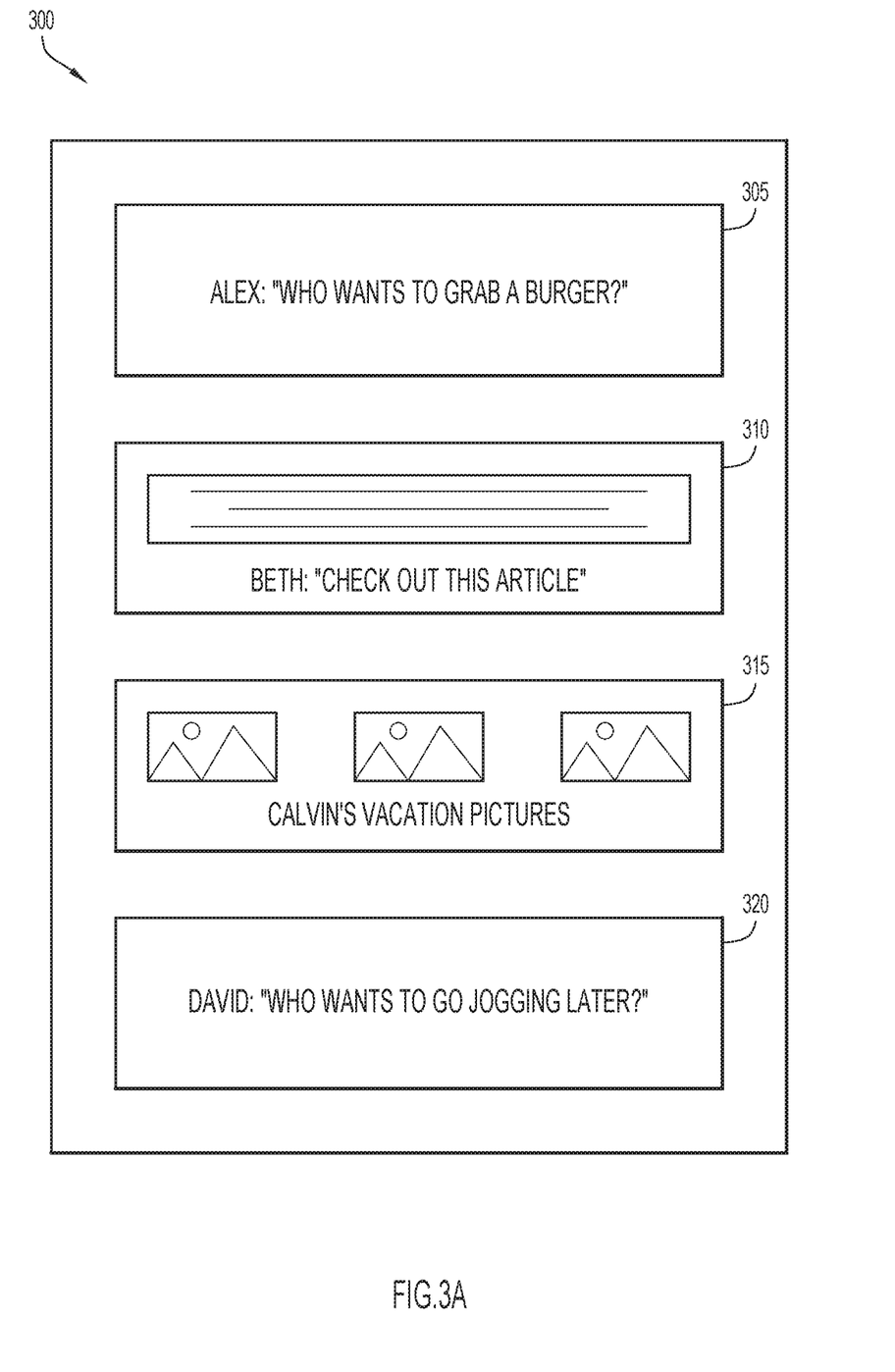
FIGS. 3A-3C are user interfaces depicting news feeds in accordance with an embodiment of the present invention.
Figure 3B:
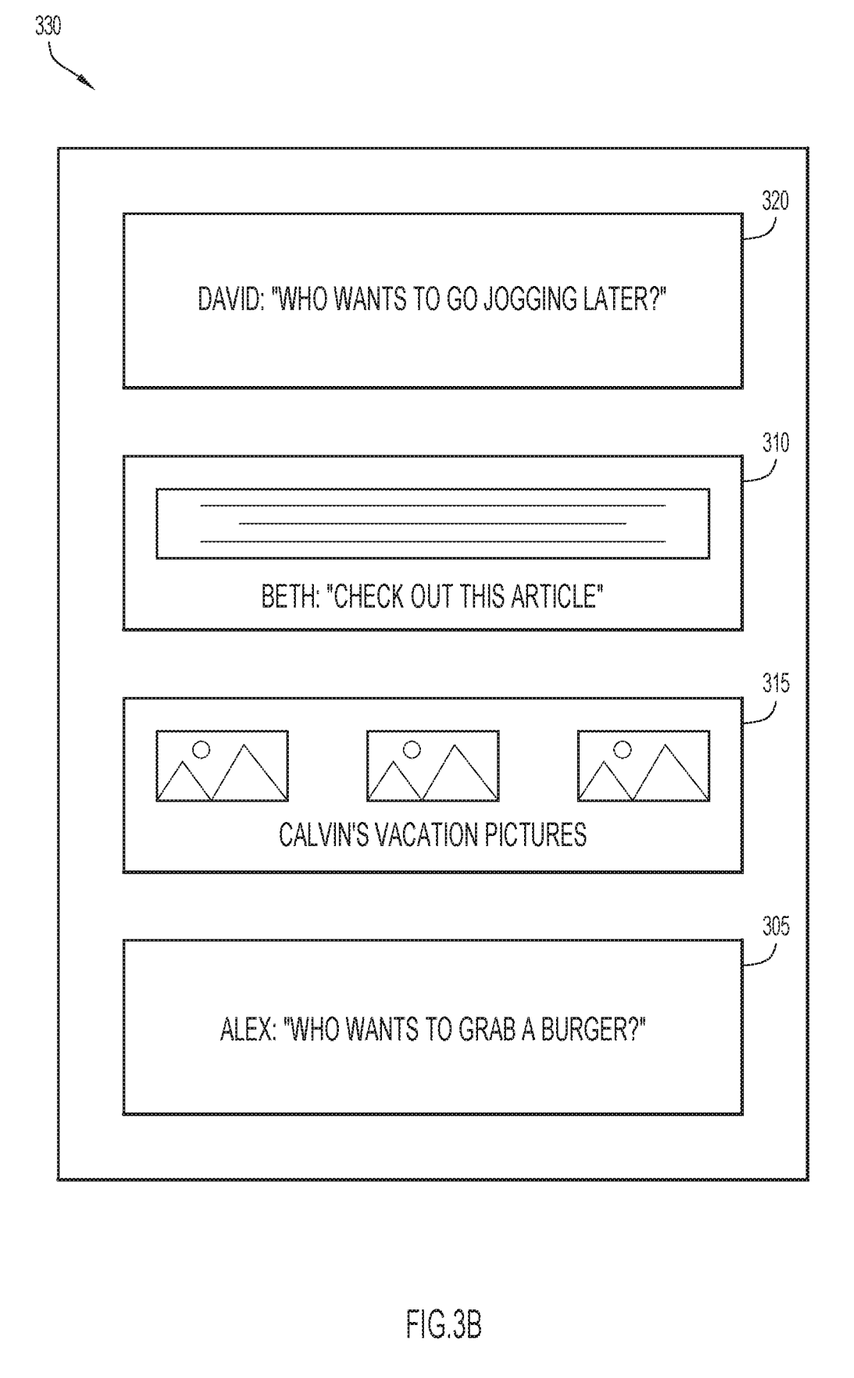
Figure 3C:
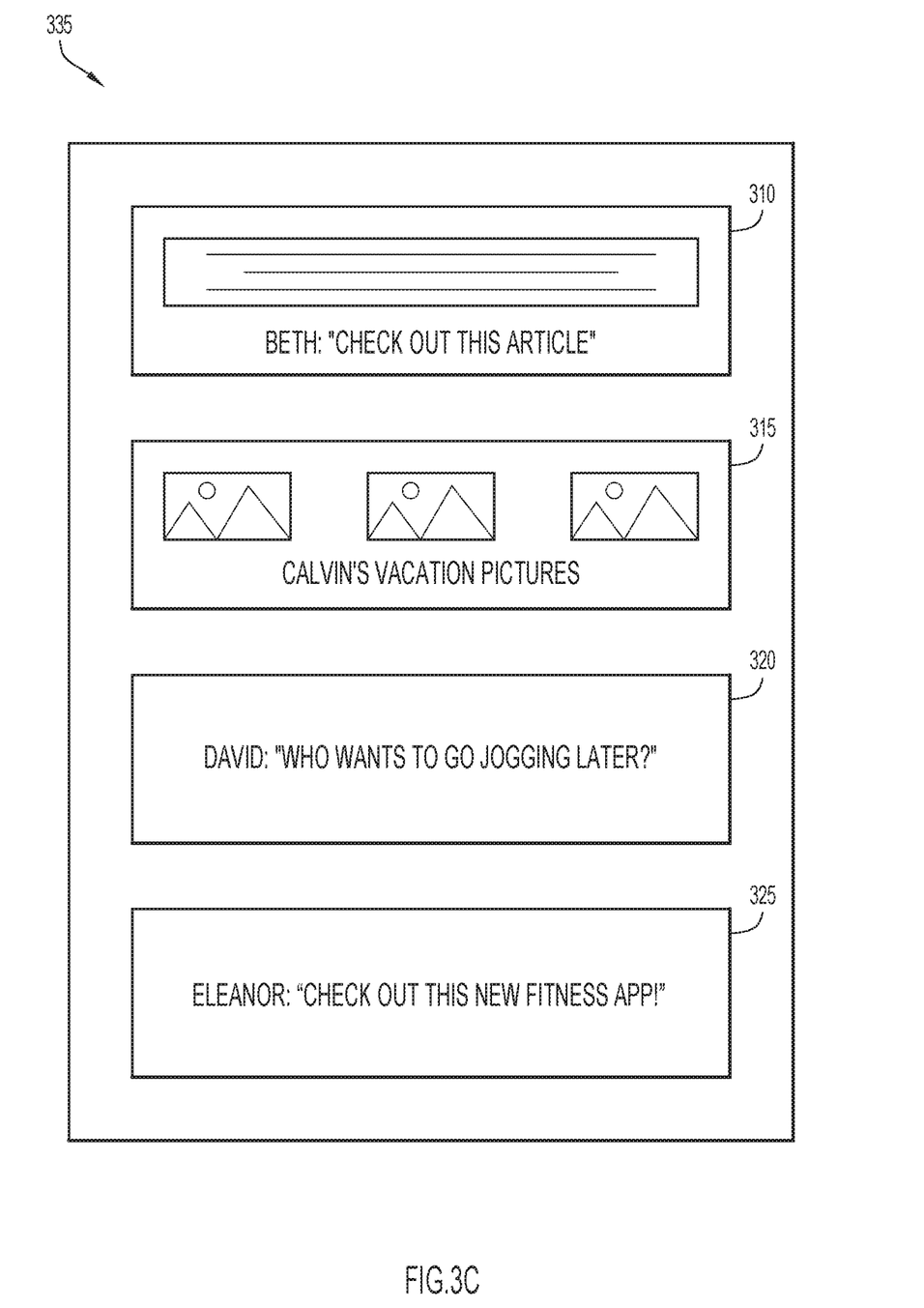

FIGS. 3A-3C are user interfaces depicting a news feed 300 in accordance with an embodiment of the present invention. FIG. 3A is a user interface depicting a news feed 300 for a user in which the electronic communications have not been modified. FIGS. 3B and 3C depicts news feeds 330 and 335 that have been modified in accordance with embodiments of the present invention.

News feed 300 includes communications 305, 310, 315, and 320. In the depicted example, goal module 155 may calculate an affinity score for communication 305 that surpasses a threshold, thus indicating that communication 305 may impair a user's goal progression, and should be de-emphasized. Likewise, a calculated affinity score for communication 320 may indicate that communication 320 may promote a user's goal progression, and should therefore be emphasized. It should be noted that news feed 300 is depicted in order to show an example of a news feed prior to modification by present invention embodiments, and therefore news feed 300 may not be presented to a user.

FIG. 3B depicts a news feed 330 in which electronic communications have been modified according to a present invention embodiment. Whereas news feed 300 may represent an original ordering of electronic communications, news feed 330 includes communications that have been modified for presentation to a user. In particular, electronic communication 320 has been emphasized in order to promote a user's goal progression, and electronic communication 305 has been de-emphasized.

FIG. 3C depicts a news feed 335 in which electronic communications have been modified according to a present invention embodiments. Whereas news feed 300 may represent an original ordering of electronic communications, news feed 335 includes communications that have been modified for presentation to a user. In particular, electronic communication 305 has been removed from news feed 335, and electronic communication 325 has been added. Electronic communication 325 may be selected using data mining techniques in order to present additional content to the user that is beneficial to advance progress of a goal.

Figure 4:
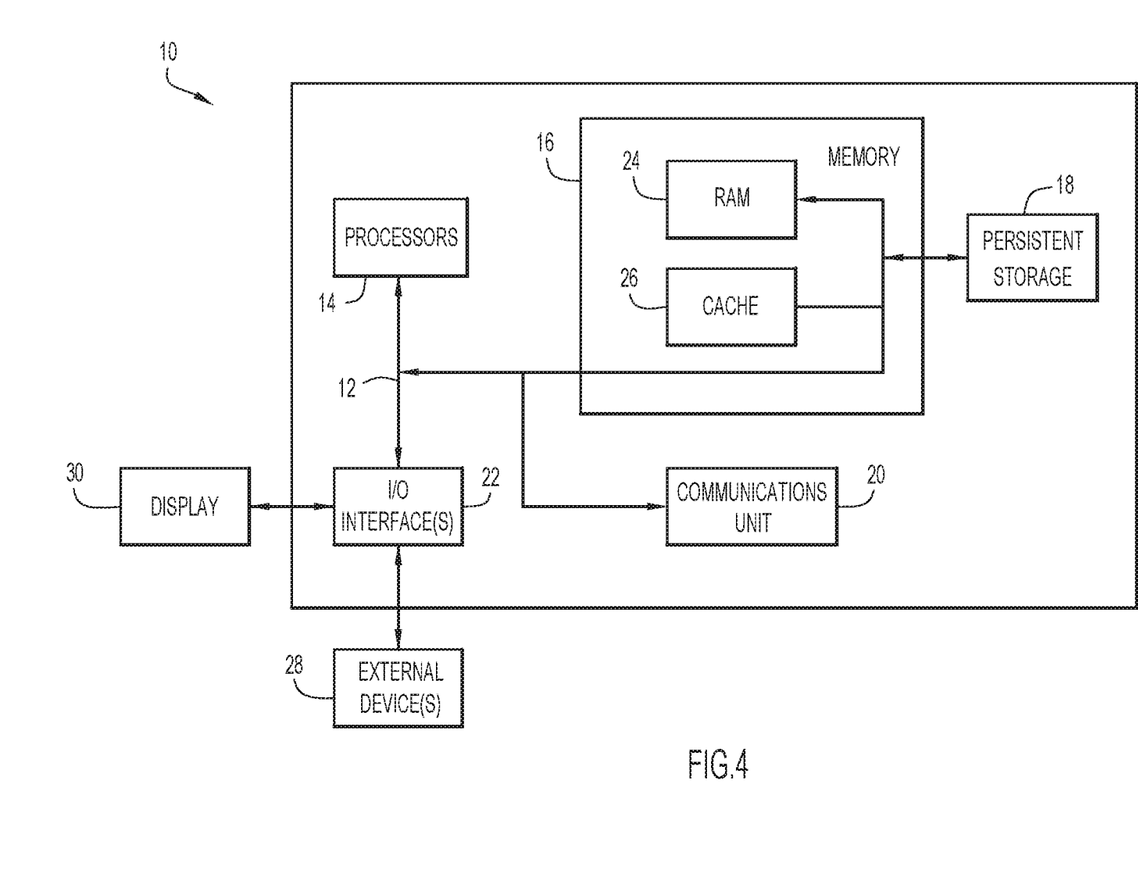
FIG. 4 is a block diagram depicting a computing device in accordance with an embodiment of the present invention.

FIG. 4 is a block diagram depicting components of a computer 10 suitable for executing the methods disclosed herein. Computer 10 may implement client devices 105A-105N, server 135, and communication server 175 in accordance with embodiments of the present invention. It should be appreciated that FIG. 4 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to processing electronic communications (e.g., electronic communication data, user data, user group data, goal data, etc.) may be stored within any conventional or other data structures (e.g., files, arrays, lists, stacks, queues, records, etc.) and may be stored in any desired storage unit (e.g., database, data or other repositories, queue, etc.) The data transmitted between client devices 105A-105N, server 135, and communication server 175 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to processing electronic communications (e.g., electronic communication data, user data, user group data, goal data, etc.) may include any information provided to, or generated by, client devices 105A-105N, server 135, and/or communication server 175. Data relating to processing electronic communications may include any desired format and arrangement, and may include any quantity of any types of fields of any size to store any desired data. The data relating to processing electronic communications may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., electronic communication data, user data, user group data, goal data, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of processing electronic communications to promote goal achievement.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., server software, communications software, communication module 115, user analysis module 145, communication analysis module 150, goal module 155, adjustment module 160, communication host module 185, etc.). These systems may include any types of monitors and input devices (e.g., keyboard, mouse, voice recognition, etc.) to enter and/or view information.

It is to be understood that the software (e.g., server software, communications software, communication module 115, user analysis module 145, communication analysis module 150, goal module 155, adjustment module 160, communication host module 185, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., server software, communications software, communication module 115, user analysis module 145, communication analysis module 150, goal module 155, adjustment module 160, communication host module 185, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to processing electronic communications). The database system may be implemented by any number of any conventional or other databases, data stores or storage structures (e.g., files, databases, data structures, data or other repositories, etc.) to store information (e.g., data relating to processing electronic communications). The database system may be included within or coupled to the server and/or client systems. The database systems and/or storage structures may be remote from or local to the computer or other processing systems, and may store any desired data (e.g., data relating to processing electronic communications).

The present invention embodiments may employ any number of any type of user interface (e.g., Graphical User Interface (GUI), command-line, prompt, etc.) for obtaining or providing information (e.g., data relating to processing electronic communications), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method of processing electronic communications comprising:
   determining, via a processor, a density and centrality of a group of users engaged in electronic communications based on an analysis of a social network graph indicating connections of the users of the group;
   analyzing the electronic communications, via the processor, and determining an affinity of the electronic communications to a constructive goal of a user of the group based on a frequency of electronic communications pertaining to the constructive goal and the determined density and centrality, wherein the determined density and centrality identifies an influential one or more users of the group of users based on a relative number of connections of the influential one or more users compared to other users of the group of users, and wherein a count of the one or more users is determined according to the density of the group of users;
   determining an intensity of items within the electronic communications pertaining to the constructive goal, wherein the intensity is based on a degree of usage of emphatic language, and wherein the electronic communications are authored by the group of users prior to the determining of the intensity; and
   modifying the electronic communications, via the processor, to advance progress of the constructive goal in response to the affinity satisfying a threshold and based on the determined intensity of the items within the electronic communications, wherein modifying the electronic communications comprises reordering the electronic communications to present first electronic communications of the influential one or more users.

2. The computer-implemented method of claim 1, wherein analyzing the electronic communications further comprises:
   identifying one or more items within the electronic communications pertaining to the constructive goal; and
   mapping the identified one or more items to a potential level of achievement of the constructive goal.

3. The computer-implemented method of claim 2, wherein determining the affinity further comprises:
   determining the affinity between the identified one or more items and the goal based on a Latent Class model.

4. The computer-implemented method of claim 1, further comprising:
   adjusting one or more parameters of the constructive goal based on the determined intensity.

5. The computer-implemented method of claim 1, wherein modifying the electronic communications further comprises:
   mining data sources to determine content for the electronic communications that is beneficial to advance the progress of the constructive goal, wherein the determined content is based on one or more from a group of specific content, frequency of content, and users providing content.

6. The computer-implemented method of claim 1, wherein the electronic communications include communications of one or more from a group of a social network site and a text messaging session.

7. The computer-implemented method of claim 1, wherein determining the density and centrality further comprises:
   determining a statistical minimum threshold for a number of users to determine the affinity.

8. A computer system for processing electronic communications, the computer system comprising:
   one or more computer processors;
   one or more computer readable storage media;
   program instructions stored on the one or more computer readable storage media for execution by at least one of the one or more computer processors, the program instructions comprising instructions to:
   determine a density and centrality of a group of users engaged in electronic communications based on an analysis of a social network graph indicating connections of the users of the group;
   analyze the electronic communications and determine an affinity of the electronic communications to a constructive goal of a user of the group based on a frequency of electronic communications pertaining to the constructive goal and the determined density and centrality, wherein the determined density and centrality identifies an influential one or more users of the group of users based on a relative number of connections of the influential one or more users compared to other users of the group of users, and wherein a count of the one or more users is determined according to the density of the group of users;
   determine an intensity of items within the electronic communications pertaining to the constructive goal, wherein the intensity is based on a degree of usage of emphatic language, and wherein the electronic communications are authored by the group of users prior to the determining of the intensity; and modify the electronic communications to advance progress of the constructive goal in response to the affinity satisfying a threshold and based on the determined intensity of the items within the electronic communications, wherein modifying the electronic communications comprises reordering the electronic communications to present first electronic communications of the influential one or more users.

9. The computer system of claim 8, wherein the program instructions to analyze the electronic communications further comprise instructions to:

identify one or more items within the electronic communications pertaining to the constructive goal; and map the identified one or more items to a potential level of achievement of the constructive goal.

10. The computer system of claim 9, wherein the program instructions to determine the affinity further comprise instructions to:

determine the affinity between the identified one or more items and the constructive goal based on a Latent Class model.

11. The computer system of claim 8, further comprising instructions to:

adjust one or more parameters of the constructive goal based on the determined intensity.

12. The computer system of claim 8, wherein the program instructions to modify the electronic communications further comprise instructions to:

mine data sources to determine content for the electronic communications that is beneficial to advance the progress of the constructive goal, wherein the determined content is based on one or more from a group of specific content, frequency of content, and users providing content.

13. The computer system of claim 8, wherein the electronic communications include communications of one or more from a group of a social network site and a text messaging session.

14. The computer system of claim 8, wherein the program instructions to determine the density and centrality further comprise instructions to:

determine a statistical minimum threshold for a number of users to determine the affinity.

15. A computer program product for processing electronic communications, the computer program product comprising one or more computer readable storage media collectively having program instructions embodied therewith, the program instructions executable by a computer to cause the computer to:

determine a density and centrality of a group of users engaged in electronic communications based on an analysis of a social network graph indicating connections of the users of the group;

analyze the electronic communications and determine an affinity of the electronic communications to a constructive goal of a user of the group based on a frequency of electronic communications pertaining to the constructive goal and the determined density and centrality, wherein the determined density and centrality identifies an influential one or more users of the group of users based on a relative number of connections of the influential one or more users compared to other users of the group of users, and wherein a count of the one or more users is determined according to the density of the group of users;

determine an intensity of items within the electronic communications pertaining to the constructive goal, wherein the intensity is based on a degree of usage of emphatic language, and wherein the electronic communications are authored by the group of users prior to the determining of the intensity; and modify the electronic communications to advance progress of the constructive goal in response to the affinity satisfying a threshold and based on the determined intensity of the items within the electronic communications, wherein modifying the electronic communications comprises reordering the electronic communications to present first electronic communications of the influential one or more users.

16. The computer program product of claim 15, wherein the program instructions to analyze the electronic communications further comprise instructions to:

identify one or more items within the electronic communications pertaining to the constructive goal; and map the identified one or more items to a potential level of achievement of the constructive goal.

17. The computer program product of claim 16, wherein the program instructions to determine the affinity further comprise instructions to:

determine the affinity between the identified one or more items and the constructive goal based on a Latent Class model.

18. The computer program product of claim 15, further comprising instructions to:

adjust one or more parameters of the constructive goal based on the determined intensity.

19. The computer program product of claim 15, wherein the program instructions to modify the electronic communications further comprise instructions to:

mine data sources to determine content for the electronic communications that is beneficial to advance the progress of the constructive goal, wherein the determined content is based on one or more from a group of specific content, frequency of content, and users providing content.

20. The computer program product of claim 15, wherein the electronic communications include communications of one or more from a group of a social network site and a text messaging session.

* * * * *